(12) United States Patent
Gupta et al.

(10) Patent No.: US 8,936,435 B2
(45) Date of Patent: Jan. 20, 2015

(54) SYSTEM AND METHOD FOR ROOT LOSS REDUCTION IN WIND TURBINE BLADES

(75) Inventors: Anurag Gupta, Manvel, TX (US); Arathi Kamath Gopinath, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 503 days.

(21) Appl. No.: 13/328,337

(22) Filed: Dec. 16, 2011

(65) Prior Publication Data

US 2013/0156593 A1 Jun. 20, 2013

(51) Int. Cl.
*F03D 1/06* (2006.01)
*F03D 11/00* (2006.01)

(52) U.S. Cl.
USPC ...... 416/23; 416/132 B; 416/169 R; 416/205; 416/239; 416/243

(58) Field of Classification Search
USPC ............ 416/23, 132 B, 169 R, 205, 224, 228, 416/239, 243
See application file for complete search history.

(56) References Cited

U.S. PATENT DOCUMENTS

| | | | | |
|---|---|---|---|---|
| 2,478,252 | A * | 8/1949 | Dean | 416/147 |
| 2,622,686 | A * | 12/1952 | Chevreau et al. | 416/23 |
| 2,729,297 | A * | 1/1956 | Felt | 416/239 |
| 5,320,491 | A * | 6/1994 | Coleman et al. | 416/24 |
| 6,814,543 | B2 | 11/2004 | Barb et al. | |
| 7,293,959 | B2 * | 11/2007 | Pedersen et al. | 416/23 |
| 7,582,977 | B1 | 9/2009 | Dehlsen | |
| 7,828,523 | B2 * | 11/2010 | Bonnet | 416/1 |
| 7,837,442 | B2 * | 11/2010 | Kirtley et al. | 416/132 B |
| 2009/0148291 | A1 * | 6/2009 | Gerber et al. | 416/147 |
| 2010/0028162 | A1 | 2/2010 | Vronsky et al. | |
| 2011/0064582 | A1 | 3/2011 | Romero Sanz et al. | |
| 2011/0142661 | A1 | 6/2011 | Sambamurty | |
| 2011/0223030 | A1 | 9/2011 | Huck et al. | |
| 2011/0229332 | A1 * | 9/2011 | Fischer et al. | 416/223 R |

FOREIGN PATENT DOCUMENTS

WO 2010133591 A1 11/2010

OTHER PUBLICATIONS

Schreck et al., "Rotational Augmentation of Horizontal Axis Wind Turbine Blade Aerodynamic Response", Wind Energy, vol. 5, Issue 2-3, pp. 133-150, Apr.-Sep. 2002.

Tangler., "Insight into Wind Turbine Stall and Post-Stall Aerodynamics", Wind Energy, vol. 7, Issue 3, pp. 247-260, Jul./Sep. 2004.

* cited by examiner

*Primary Examiner* — Igor Kershteyn
(74) *Attorney, Agent, or Firm* — Ann M. Agosti

(57) ABSTRACT

A wind turbine blade includes a root region. A first extension (LEX) is attached to the leading edge side of the root region while a trailing edge strake (TES) is attached to the trailing edge side of the root region. The LEX and TES each include an outer profile that becomes more pronounced relative to their respective locations in the root region as the root region of the wind turbine blade morphs from a substantially cylindrical shape to a substantially airfoil shape. The LEX provides both optimal angle of attack and lift generation in the root region, while the TES mitigates airflow separation and enhances airfoil lift in the root region.

21 Claims, 2 Drawing Sheets

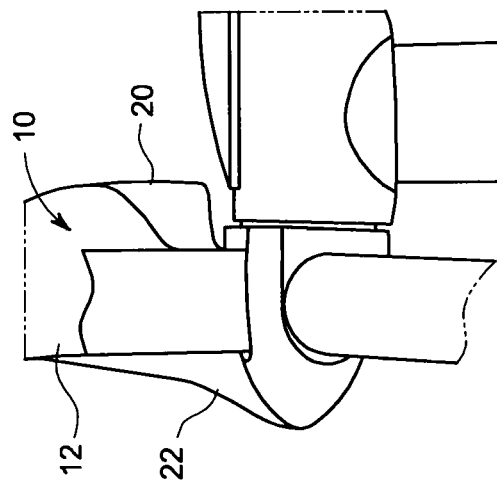
FIG. 1
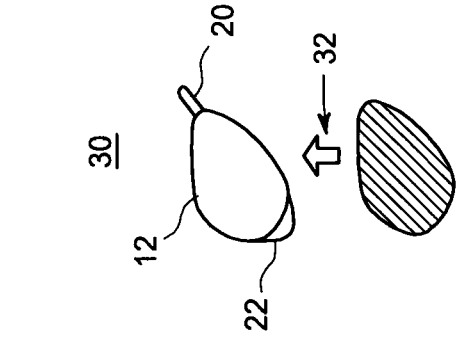
FIG. 2
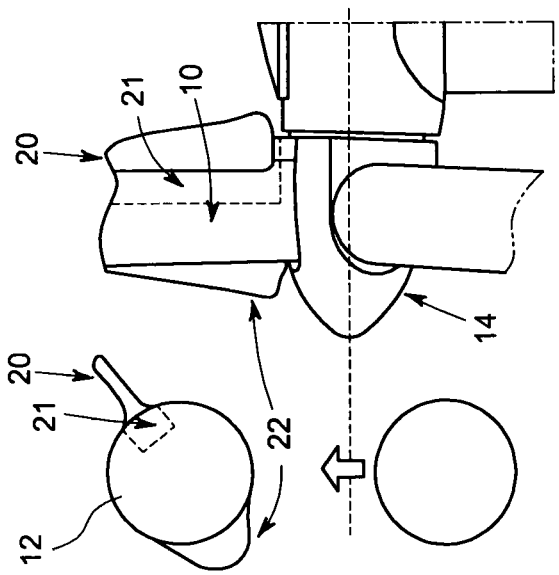
FIG. 3
FIG. 4

SYSTEM AND METHOD FOR ROOT LOSS REDUCTION IN WIND TURBINE BLADES

BACKGROUND

The subject matter of this disclosure relates generally to rotor blades for a wind turbine, and more particularly to a leading edge extension (LEX) in combination with a trailing edge strake (TES) as a means of reducing aerodynamic losses and enhancing torque extraction from the root section of a wind turbine blade.

Rotor blades are primary elements of wind turbines for the conversion of wind energy into electrical energy. The working principle of the rotor blades resembles that of airplane wings. A cross-section of a typical blade, during operation thereof, enables air to flow along both sides of the blade producing a pressure difference between the sides. Consequently, a lift force, which is directed from a pressure side towards a suction side, acts on the blade.

In addition, an attached-flow region has a mainly laminar flow along an outer surface area of the blade. In contrast, a detached-flow region in the wake of flow separation has a more turbulent flow. Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc).

The lift force is predominantly created in the attached-flow region, whereas the detached-flow region leads to an increase in drag force, mainly due to a pressure difference between the upstream attached-flow region and the downstream detached-flow region.

The force component used to produce electrical power is a portion of the lift force acting as torque on the rotor main shaft. Hence, in order to increase the energy conversion efficiency during normal operation of the wind turbine, it is desired to maximize the lift force. On the other hand, it is generally desired to minimize the drag force. To this purpose, it is advantageous to increase the attached-flow region and to reduce the detached-flow region by having the flow separation near a trailing edge of the blade, i.e. in a downstream region of the blade. Also, it is generally desired to have a stable flow separation, e.g. in order to increase the working stability or to decrease noise generation.

Current manufacturing practices generally prevent the attainment of desired or ideal angles of attack in the root region of wind turbine blades due to constraints on blade twist. The root region airfoil sections, as a result, are at very high angles of attack resulting in separation, poor lift to drag (L/D) ratio, and low lift. Interpolated sections from the first designed airfoil to the cylindrical section of the root are also not aerodynamically optimized, resulting is less than optimal aerodynamic performance.

In view of the foregoing, there is a need for an airfoil structure that overcomes the foregoing disadvantages to provide more optimal aerodynamic shapes in the airfoil root regions.

BRIEF DESCRIPTION

An exemplary wind turbine blade embodiment comprises:
a root section comprising a leading edge side and a trailing edge side;
an extension attached to the leading edge side of the root section; and
a strake attached to the trailing edge side of the root section, wherein the leading edge extension (LEX) provides both optimal angle of attack and lift generation in the root section, and further wherein the strake mitigates airflow separation and enhances airfoil lift in the root region.

According to another embodiment, a wind turbine blade comprises:
a root section attached to a rotor disk portion of a wind turbine, the root section comprising a leading edge side and a trailing edge side;
a leading edge extension (LEX) attached to the leading side of the root section, the extension configured to provide an enhanced lift coefficient and reduced flow separation in the root section; and
a trailing edge strake (TES) attached to the trailing edge side of the root section, the TES configured to provide enhanced lift to drag ratio in the root section, reduced flow separation in the root section, or both enhanced lift to drag ratio and reduced flow separation in the root region, wherein the LEX and TES together are configured to reduce radial centrifuging of flow slipping through the rotor disk portion of the wind turbine without extraction of energy.

According to yet another embodiment, a wind turbine blade comprises:
a root region comprising a leading edge side and a trailing edge side;
a leading edge extension (LEX) attached to the leading edge side of the root region; and
a trailing edge strake (TES) attached to the trailing edge side of the root region, wherein the LEX and TES each comprise an outer profile that becomes more pronounced relative to their respective locations in the root region as the root region of the wind turbine blade morphs from a substantially cylindrical shape to a substantially airfoil shape.

DRAWINGS

The foregoing and other features, aspects and advantages of the invention are apparent from the following detailed description taken in conjunction with the accompanying drawings in which like characters represent like parts throughout the drawings, wherein:

FIG. 1 is a perspective diagram illustrating the root region of wind turbine blades according to one embodiment;

FIG. 2 is side view illustrating the root region depicted in FIG. 1;

FIG. 3 illustrates a root region leading edge extension and a root region strake according to one embodiment;

FIG. 4 illustrates geometric cross-section changes in the leading edge extension and strake depicted in FIG. 3 relative to the radial location of the leading edge extension and strake with respect to the wind turbine blade root region;

Figure 5:
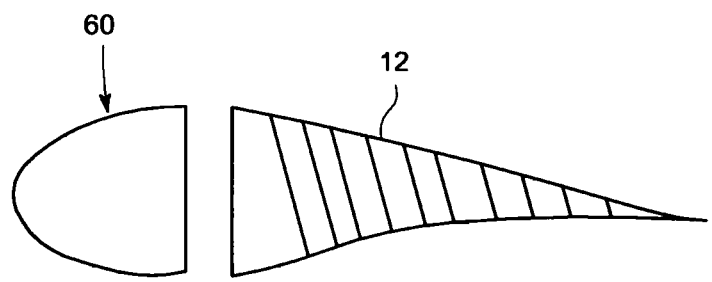
FIG. 5 is a simplified diagram illustrating a modular root section of an airfoil according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

FIG. 1 is a perspective diagram illustrating the root region 10 of wind turbine blades 12 according to one embodiment. The wind turbine blades 12 are attached to a rotor disk 14 portion of a wind turbine 16.

FIG. 2 is side view illustrating the root region 10 depicted in FIG. 1. Each wind turbine blade 12 has a leading edge extension (LEX) 22 and a trailing edge strake (TES) 20 attached to its corresponding root region 10. The present inventors discovered the combination of a leading edge extension 22 and a trailing edge strake 20 provided a means of reducing aerodynamic losses and enhancing torque extraction from the root section of a wind turbine blade 12.

FIG. 3 illustrates a root region leading edge extension 22 and a root region trailing edge strake 20 attached to a wind turbine blade 12 according to one embodiment. The LEX 22 is attached to the nose of an existing root airfoil section/region 10 and provides both an optimal incidence angle (angle of attack in a real operating condition) as well as lift generation. This feature enhances the lift coefficient (CL) of the root region of the airfoil/blade 12, and can be tailored to reduce the extent of flow separation in the root regions 10. According to particular aspects, the LEX 22 can be attached adhesively, mechanically or otherwise attached to an existing structure/blade 12 to create a new leading edge/nose shape.

The TES/strake 20 was discovered to provide a plurality of advantages. These advantages include without limitation, 1) stabilization in regions of existing separated air flow (like a splitter plate), to alter the loading on the airfoil side on which the strake 20 is attached so that it alters the streamwise pressure gradient and mitigate the extent of separation, and 2) creation of extra camber to generate lift. Any one or more of the foregoing advantages can be provided via specific design instantiations. A subsequent reduction in separation advantageously provides an enhanced lift to drag (L/D) ratio of the root section/region 10 allowing a reduction in the radial centrifuging of flow slipping through the correspond rotor disk 14.

1. FIG. 4 illustrates geometric cross-section changes 30 in the leading edge extension 20 and trailing edge strake 22 depicted in FIG. 3 relative to the radial location 32 of the leading edge extension 20 and trailing edge strake 22 between the wind turbine blade root region 10 and the tip of the wind turbine blade 12. More specifically, the LEX 20 and strake/TES 22 together comprise an outer profile that becomes more pronounced relative to their location in the root section as the root section of the wind turbine blade morphs from a substantially cylindrical shape to a substantially airfoil shape.

FIG. 5 is a modular root section 60 of an airfoil/wind turbine blade 12 according to one embodiment. According to particular embodiments, the modular root section 60 is formulated using the principles described herein before. The modular root section 60 can be attached to the airfoil/blade 12 prior to installation of the airfoil/blade 12 onto a rotor disk 14 such as depicted in FIG. 1. According to particular aspects, the modular root section 60 can be attached adhesively, mechanically or otherwise attached to an existing airfoil/blade 12 to create a new leading edge/nose shape.

Figure 6:
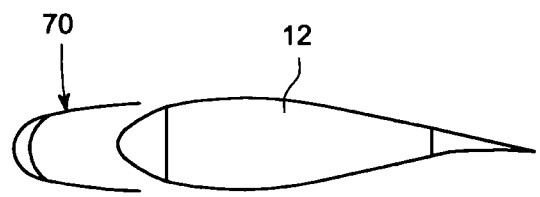
FIG. 6 is a diagram illustrating a side view of a modular root section of an airfoil according to another embodiment.

FIG. 6 is a diagram illustrating a modular root section 70 of an airfoil/wind turbine blade 12 according to another embodiment. According to particular embodiments, the modular root section 70 is formulated using the principles described herein before. The modular root section 70 comprises a sleeve type structure having an internal surface profile that conforms to the outer profile of an airfoil/blade 12. The modular root section 70 can be attached to the airfoil/blade 12 prior to installation of the airfoil/blade 12 onto a rotor disk 14 such as depicted in FIG. 1. According to particular aspects, the modular root section 70 can be attached adhesively, mechanically or otherwise attached to an existing airfoil/blade 12 to create a new leading edge/nose shape.

With continued reference to FIGS. 1-3, the LEX 22 and TES 20 according to one embodiment extend from the root 10 (as close to the cylinder section as possible considering any clearance issues) to as far span-wise as needed to mitigate the separation extent (potentially up to 30% span) from the conventional blade 12. At certain pitch settings, the trailing edge of the blade 12 can be positioned very close to the tower 16 posing tower strike issues with the trailing edge strake 20, requiring constraints to be imposed on the sizing of the trailing edge strake 20.

The LEX 22 adds camber to the leading edge and has a more "pointed" shape compared to the original root shape at that cross-section, hence increasing the airfoil 12 Clmax but also making the stall point sharper. At the location where the LEX 22 attaches to the root section 10, it is tangent and blends seamlessly in order to prevent any forced transition to turbulent flow or separation—attached for example, using a suitable glue or via mechanical fasteners.

The TES 20 is like a splitter plate that in the spanwise direction can have different points of attachment (on PS or SS) and have different twists, lengths etc. The TES 20 stabilizes the separated flow near the trailing edge reducing the extent of the shed vortices that could benefit the downstream wind turbines in a wind farm. Stabilizing the separated flow also advantageously reduces spanwise migration of the separated flow.

As demonstrated herein, the sizing of the TE strake 20 is of importance, considering any tower strike issues at high pitch settings. According to one embodiment, tower strike issues can be mitigated by providing one or more small openings 21 on the pressure side and/or suction side of the airfoil 12 that allows for partially or fully retracting the strake 20 inside the airfoil/blade 12 at high pitch settings, thus avoiding any tower strike issues, as well as avoiding any damage to the add-on strake feature due to high loads at severe wind gust conditions when the blade 12 is typically feathered (high pitch setting). According to one embodiment, the retractable strake 20 is split into sections span-wise for ease of implementation; and according to another embodiment, each section is actuated independently of each other section.

In summary explanation, structural embodiments have been described herein comprising a leading edge extension (LEX) 22 in combination with a trailing edge strake (TES) 20 as a means of reducing aerodynamic losses and enhancing torque extraction from the root section of a wind turbine blade. The combined LEX/TES advantageously increase rotor power coefficient (Cp), and therefore annual energy production (AEP) without having to radically alter current manufacturing paradigms. Analysis results indicate a combined LEX/TES structure will provide greater than 1% increase in AEP. This is substantial since 1% AEP has a significant NPV~(10 k)/MW.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine blade comprising:
    a root region comprising a circular portion, a leading edge side and a trailing edge side;
    an extension attached to the leading edge side of the root; and
    a strake retractably attached to the trailing edge side of the root region, wherein the strake is separate and distinct from the leading edge side extension (LEX), and further wherein the LEX provides both optimal angle of attack and lift generation in the root region, and further wherein the strake mitigates airflow separation and enhances airfoil lift in the root region, and further wherein the circular portion of the root region of the wind turbine blade comprises at least one opening for receiving at least a portion of the strake.

2. The wind turbine blade according to claim 1, wherein the LEX is attached to the leading edge side of the root section by adhesive material, mechanical devices, frictional force, or any combination of adhesive material, mechanical devices, and frictional force.

3. The wind turbine blade according to claim 1, wherein the strake is attached to the trailing edge side of the root region by adhesive material, mechanical devices, frictional force, or any combination of adhesive material, mechanical devices, and frictional force.

4. The wind turbine blade according to claim 1, wherein the LEX comprises a modular structure configured to be both quickly and easily attached and quickly and easily removed from the root region of a wind turbine blade.

5. The wind turbine blade according to claim 1, wherein the strake comprises a modular structure configured to be both quickly and easily attached and quickly and easily removed from the root region of a wind turbine blade.

6. The wind turbine blade according to claim 1, wherein the LEX comprises an outer profile that becomes more pronounced relative to the location of the LEX in the root region as the root region of the wind turbine blade morphs from a substantially cylindrical shape to a substantially airfoil shape.

7. The wind turbine blade according to claim 1, wherein the strake comprises an outer profile that becomes more pronounced relative to the location of the strake in the root region as the root region of the wind turbine blade morphs from a substantially cylindrical shape to a substantially airfoil shape.

8. The wind turbine blade according to claim 1, further comprising a pressure side and a suction side, wherein at least a portion of the strake is retractable, and further wherein the pressure side, the suction side, or both the pressure side and the suction side of the wind turbine blade comprise one or more openings configured to receive at least a portion of the strake as the strake is partially or fully retracted into the one or more openings.

9. A wind turbine blade comprising:
a root region attached to a rotor disk portion of a wind turbine, the root region comprising a circular portion, a leading edge side and a trailing edge side;
a leading edge extension (LEX) attached to the leading edge side of the root section, the extension configured to provide an enhanced lift coefficient and reduced flow separation in the root section; and
a trailing edge strake (TES) that is and distinct from the LEX and that is retractably attached to the trailing edge side of the root region, the TES configured to provide enhanced lift to drag ratio in the root region, reduced flow separation in the root region, or both enhanced lift to drag ratio and reduced flow separation in the root region, wherein the LEX and TES together are configured to reduce radial centrifuging of flow slipping through the rotor disk portion of the wind turbine without extraction of energy, and further wherein the circular portion of the root region of the wind turbine blade comprises at least one opening for receiving at least a portion of the TES.

10. The wind turbine blade according to claim 9, wherein the LEX is attached to the leading edge side of the root region by adhesive material, mechanical devices, frictional force, or any combination of adhesive material, mechanical devices, and frictional force.

11. The wind turbine blade according to claim 9, wherein the strake is attached to the trailing edge side of the root region by adhesive material, mechanical devices, frictional force, or any combination of adhesive material, mechanical devices, and frictional force.

12. The wind turbine blade according to claim 9, wherein the TES comprises a modular structure configured to be both quickly and easily attached and quickly and easily removed from the root region of a wind turbine blade.

13. The wind turbine blade according to claim 9, wherein the strake comprises a modular structure configured to be both quickly and easily attached and quickly and easily removed from the root region of a wind turbine blade.

14. The wind turbine blade according to claim 9, wherein the LEX comprises an outer profile that becomes more pronounced relative to the location of the LEX in the root region as the root region of the wind turbine blade morphs from a substantially cylindrical shape to a substantially airfoil shape.

15. The wind turbine blade according to claim 9, wherein the TES comprises an outer profile that becomes more pronounced relative to the location of the TES in the root region as the root region of the wind turbine blade morphs from a substantially cylindrical shape to a substantially airfoil shape.

16. The wind turbine blade according to claim 9, further comprising a pressure side and a suction side, wherein at least a portion of the strake is retractable, and further wherein the pressure side, the suction side, or both the pressure side and the suction side of the wind turbine blade comprise one or more openings configured to receive at least a portion of the strake as the strake is partially or fully retracted into the one or more openings.

17. A wind turbine blade comprising:
a root region comprising a circular portion, a leading edge side and a trailing edge side;
a leading edge extension (LEX) attached to the leading edge side of the root region; and
a trailing edge strake (TES) that is separate and distinct from the LEX and that is retractably attached to the trailing edge side of the root region, wherein the LEX and TES each comprise an outer profile that becomes more pronounced relative to their respective locations in the root region as the root region of the wind turbine blade morphs from a substantially cylindrical shape to a substantially airfoil shape, and further wherein the circular portion of the root region of the wind turbine blade comprises at least one opening for receiving at least a portion of the TES.

18. The wind turbine blade according to claim 17, wherein the LEX is configured to provide both optimal angle of attack and lift generation in the root region, and further wherein the strake or TES is configured to mitigate airflow separation in the root region, enhance airfoil lift in the root region, and enhance mix out of wakes and vortices in the root region.

19. The wind turbine blade according to claim 17, wherein both the LEX and TES are attached to the root region of the wind turbine blade by adhesive material, mechanical devices, frictional force, or any combination of adhesive material, mechanical devices, and frictional force.

20. The wind turbine blade according to claim 17, wherein the LEX and TES together comprise a modular structure configured to be both quickly and easily attached and quickly and easily removed from the root region of a wind turbine blade.

21. The wind turbine blade according to claim 17, further comprising a pressure side and a suction side, wherein at least a portion of the strake is retractable, and further wherein the pressure side, the suction side, or both the pressure side and the suction side of the wind turbine blade comprise one or more openings configured to receive at least a portion of the strake as the strake is partially or fully retracted into the one or more openings.

* * * * *

UNITED STATES PATENT AND TRADEMARK OFFICE
CERTIFICATE OF CORRECTION

PATENT NO. : 8,936,435 B2  
APPLICATION NO. : 13/328337  
DATED : January 20, 2015  
INVENTOR(S) : Gupta et al.

Page 1 of 1

It is certified that error appears in the above-identified patent and that said Letters Patent is hereby corrected as shown below:

In the specification,

In Column 2, Line 42, delete "is side" and insert -- is a side --, therefor.

In Column 3, Line 1, delete "is side" and insert -- is a side --, therefor.

In Column 3, Line 35, delete "1.".

In Column 3, Line 36, delete "leading edge extension 20 and trailing edge strake 22" and insert -- leading edge extension 22 and trailing edge strake 20 --, therefor.

In Column 3, Lines 37-38, delete "leading edge extension 20 and trailing edge strake 22" and insert -- leading edge extension 22 and trailing edge strake 20 --, therefor.

In Column 3, Line 40, delete "LEX 20 and strake/TES 22" and insert -- LEX 22 and strake/TES 20 --, therefor.

In the claims,

In Column 5, Line 53, in Claim 9, delete "that is" and insert -- that is separate --, therefor.

Signed and Sealed this  
Twenty-eighth Day of April, 2015

Michelle K. Lee  
*Director of the United States Patent and Trademark Office*